US007454593B2

(12) United States Patent
Kirsch

(10) Patent No.: US 7,454,593 B2
(45) Date of Patent: Nov. 18, 2008

(54) ROW AND COLUMN ENABLE SIGNAL ACTIVATION OF PROCESSING ARRAY ELEMENTS WITH INTERCONNECTION LOGIC TO SIMULATE BUS EFFECT

(75) Inventor: Graham Kirsch, Hampshire (GB)

(73) Assignee: Micron Technology, Inc., Boise, ID (US)

( * ) Notice: Subject to any disclaimer, the term of this patent is extended or adjusted under 35 U.S.C. 154(b) by 839 days.

(21) Appl. No.: 10/412,716

(22) Filed: Apr. 11, 2003

(65) Prior Publication Data

US 2004/0054870 A1 Mar. 18, 2004

(30) Foreign Application Priority Data

Sep. 17, 2002 (GB) ................................. 0221563.0

(51) Int. Cl.
*G06F 15/17* (2006.01)
(52) U.S. Cl. .......................................... 712/11; 712/16
(58) Field of Classification Search .................... 712/11, 712/16
See application file for complete search history.

(56) References Cited

U.S. PATENT DOCUMENTS

| 3,308,436 | A | * | 3/1967 | Borck, Jr. et al. ............. 712/10 |
| 4,876,534 | A | | 10/1989 | Mead et al. ............... 340/14.67 |
| 4,942,517 | A | * | 7/1990 | Cok ............................. 712/11 |
| 4,992,933 | A | * | 2/1991 | Taylor ......................... 712/22 |
| 5,408,676 | A | * | 4/1995 | Mori ........................... 712/16 |
| 5,444,701 | A | * | 8/1995 | Cypher et al. ............... 370/406 |
| 5,689,719 | A | * | 11/1997 | Miura et al. ................. 712/11 |
| 5,898,881 | A | | 4/1999 | Miura et al. ................. 712/16 |
| 6,728,862 | B1 | * | 4/2004 | Wilson ......................... 712/14 |
| 6,754,801 | B1 | * | 6/2004 | Kirsch .......................... 712/14 |
| 6,970,196 | B1 | * | 11/2005 | Ishikawa et al. ............ 348/308 |
| 2002/0133688 | A1 | * | 9/2002 | Lee et al. ..................... 712/22 |
| 2003/0026237 | A1 | * | 2/2003 | Mohebbi et al. ............ 370/345 |

FOREIGN PATENT DOCUMENTS

| EP | 0 375 401 A1 | 6/1990 |
| WO | 01/090915 A3 | 11/2001 |

* cited by examiner

*Primary Examiner*—Kenneth S Kim
(74) *Attorney, Agent, or Firm*—Dorsey & Whitney LLP

(57) ABSTRACT

The present invention relates to the control of an array of processing elements in a parallel processor using row and column select lines. For each column in the array, a column select line connects to all of the processing elements in the column. For each row in the array, a row select line connecting to all of the processing elements in the row. A processing element in the array may be selected by activation of its row and column select lines. The processing elements are connected to adjacent processing elements by respective segments of a row bus for each row and by respective segments of a column bus for each column. Each row of the array includes a respective column edge register coupled to a processing element at one end of the respective row and to a processing element at the other end of the respective row. Similarly, each column of the array includes a respective row edge register coupled to a processing element at one end of the respective row and to a processing element at the other end of the respective row. The column edge registers allow digital signals to be coupled between the processing elements at the ends of the respective row, and the row edge registers allow digital signals to be coupled between the processing elements at the ends of the respective column.

15 Claims, 12 Drawing Sheets

ROW AND COLUMN ENABLE SIGNAL ACTIVATION OF PROCESSING ARRAY ELEMENTS WITH INTERCONNECTION LOGIC TO SIMULATE BUS EFFECT

CROSS-REFERENCE TO RELATED APPLICATION

This application claims priority from UK Patent Application No. 0221563.0, filed Sep. 17, 2002.

FIELD OF THE INVENTION

The present invention relates to the control of processing elements in a parallel processor. Preferred embodiments of the present invention relate to the control of an array of processing elements in an active memory device.

BACKGROUND TO THE INVENTION

A simple computer generally includes a central processing unit (CPU) and a main memory. The CPU implements a sequence of operations encoded in a stored program. The program and the data on which the CPU acts are typically stored in the main memory. The processing of the program and the allocation of main memory and other resources are controlled by an operating system. In operating systems where multiple applications may share and partition resources, the processing performance of the computer can be improved through use of active memory.

Active memory is memory that processes data as well as storing it. It can be instructed to operate on its contents without transferring its contents to the CPU or to any other part of the system. This is typically achieved by distributing parallel processors throughout the memory. Each parallel processor is connected to the memory and operates on it independently. Most of the data processing can be performed within the active memory and the work of the CPU is thus reduced to the operating system tasks of scheduling processes and allocating system resources.

A block of active memory typically consists of the following: a block of memory, e.g. dynamic random access memory (DRAM), an interconnection block and a memory processor (processing element array). The interconnection block provides a path that allows data to flow between the block of memory and the processing element array. The processing element array typically includes multiple identical processing elements controlled by a sequencer. Processing elements are generally small in area, have a low degree of hardware complexity, and are quick to implement, which leads to increased optimisation. Processing elements are usually designed to balance performance and cost. A simple more general-purpose processing element will result in a higher level of performance than a more complex processing element because it can ,easily be coupled to many identical processing elements. Further, because of its simplicity, the processing element will clock at a faster rate.

In any computer system, it is important that data can be made available to the processor as quickly as possible. In a parallel processor, the organisation of data in the processing element array is an important part of the execution of many algorithms. Hence, the provision of an efficient means of moving data from one processing element to another is an important consideration in the design of the processing element array.

In the past, several different methods of connecting processing elements have been used in a variety of geometric arrangements, including hypercubes, butterfly networks, one-dimensional strings/rings and two-dimensional meshes In a two-dimensional mesh, the processing elements are arranged in rows and columns, with each processing element being connected to its four neighbouring processing elements in the rows above and below and the columns either side (directions herein referred to as north, south, east and west).

In current systems, movement of data between the processing elements generally occurs as a parallel operation, i.e. every processing element sends and receives data from other processing elements at the same time. Data can be viewed as being shifted in one of four directions (north, south, east and west) along all of the processing elements in the rows or columns.

In addition, there may also be a column of edge registers located along an east or west side of the processing element array and a row of edge registers located along an north or south side, each register being connected to the processing elements at both ends of every row or column. The edge registers permit data to be shifted into or out of the processing element array as data is shifted along the rows or columns.

One problem with current system and methods of shifting data between processing elements in a processing element array is that every processing element has to send and receive data at the same time. Thus, movement of data around the processing element array can generally only occur in a limited number of different transformations and movement of data between two processing elements, which are not neighbours, has to take place over a number of shift operations. It is therefore desirable to reduce the number of shift operations that are required to move data between non-neighbouring processing elements.

Accordingly, it is an object of the present invention to provide a more efficient means of moving data from one processing element to another.

It is a further object of the present invention to provide a more flexible parallel processor in which data can be moved easily between non-neighbouring processing elements in a single operation.

BRIEF DESCRIPTION OF THE DRAWINGS

A specific embodiment of the present invention will now be described by way of example only and with reference to the accompanying drawings, in which.

DETAILED DESCRIPTION

Figure 1:
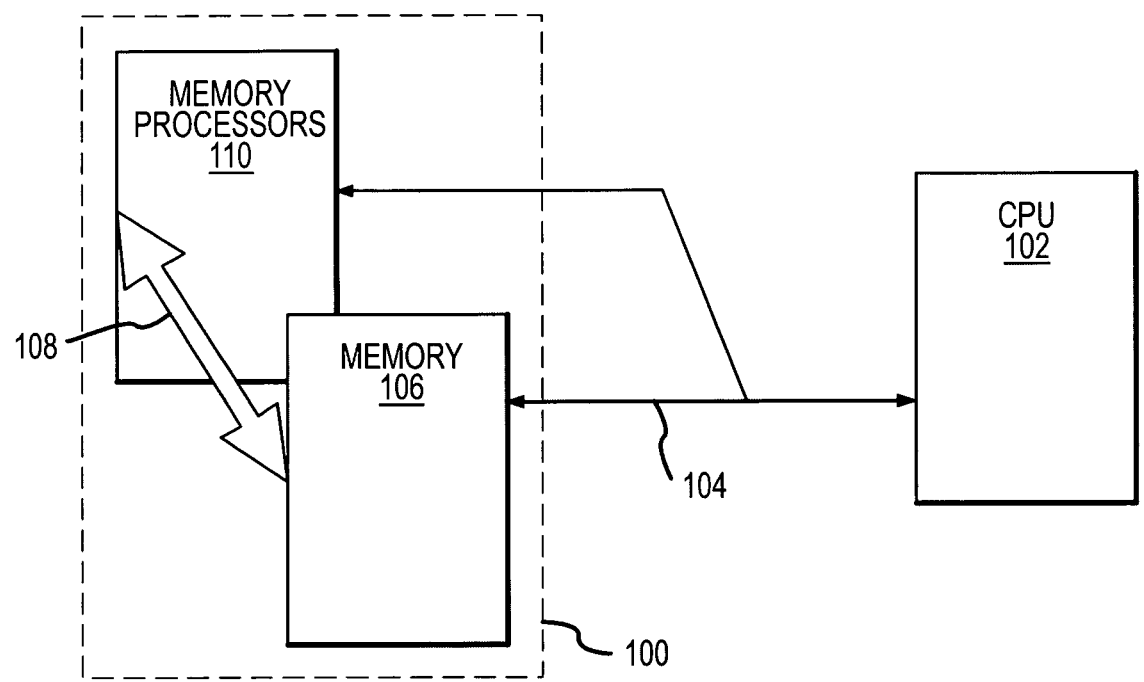
FIG. 1 shows one embodiment of an active memory block in accordance with the present invention.

Referring to FIG. 1, one embodiment of an active memory block in accordance with the invention is shown. Active memory block 100 includes a memory 106 and memory processors 110. Memory 106 is preferably random access memory (RAM), in particular dynamic RAM (DRAM). Memory processors 110, which include processing element (PE) arrays, can communicate with memory 106 via an interconnection block 108. The interconnection block 108 can be any suitable communications path, such as a bi-directional high memory bandwidth path. A central processing unit (CPU) 102 can communicate with active memory block 100 via a communications path 104. The communications path 104 may be any suitable bi-directional path capable of transmitting data.

Figure 2:
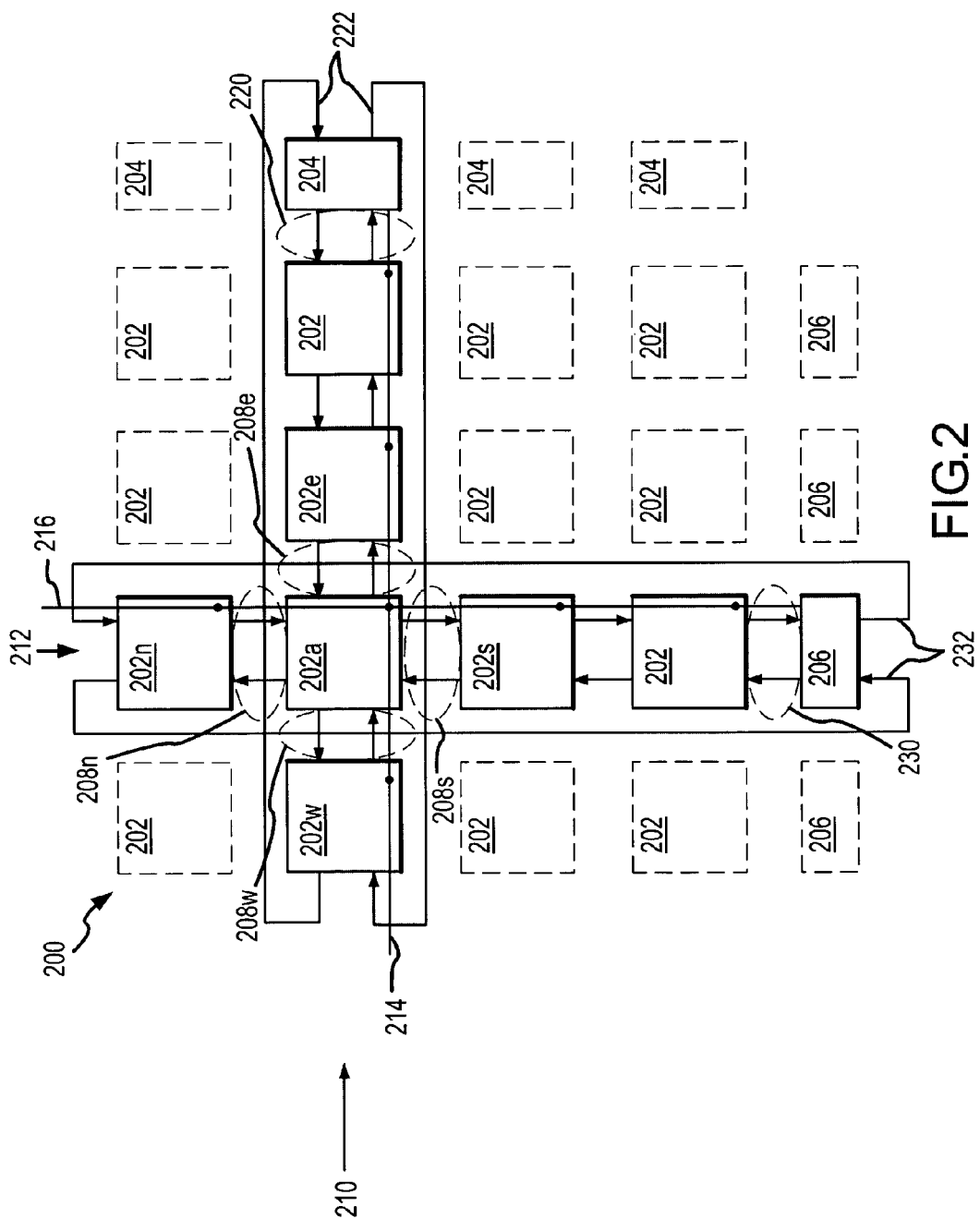
FIG. 2 shows one embodiment of a partitioned active memory block in accordance with the invention.

Referring to FIG. 2, a processing element array 200 having multiple processing elements arranged in rows and columns is shown. The array 200 is shown as an array of 4 columns×4 rows. However, it will be appreciated that the array 200 could be scaled to larger sizes and could have unequal numbers of rows and columns. However, in general, the array is likely to have 16 rows and 16 columns. For clarity, the array 200 is shown with connections along a single row 210 and a single column 212 only, although, in practice, there would be similar connections on all of the rows and columns. In particular, the present invention will be discussed below in connection with a processing element 202a, although those of ordinary skill will recognise that every processing element in the processing element array will operate in a similar way.

The processing element 202a is configured to accept and process a data from neighbouring processing elements 202n, 202e, 202s, 202w and is connected to the neighbouring processing elements 202n, 202e, 202s, 202w via respective segments of column buses 208n, 208s and respective segments of row buses 208e, 208w. The neighbouring processing elements 202n, 202e, 202s, 202w lie each side of the processing element 202a in neighbouring rows and columns and can be referred to as a north neighbouring processing element 202n, an east neighbouring processing element 202e, a south neighbouring processing element 202s and a west neighbouring processing element 202w corresponding to conventional notation and as shown in FIG. 2.

Each bus segment 208n, 208e, 208s, 208w comprises an input bus segment and an output bus segment, each of which includes a network of wires to transfer data between the processing elements. The number of wires equals the number of processing element bits (e.g. 8 bits) in data input or output from the processing element 202a.

Along one vertical edge of the array 200 are column edge registers 204, each column edge register is connected via a first bi-directional register row bus segment 220 to a neighbouring processing element in its row and via a second bi-directional row bus segment 222 to the processing element at the other vertical edge in its row. Along one horizontal edge of the array 200 are row edge registers 206, each row edge register is connected via a first bidirectional register column bus segment 230 to a neighbouring processing element in its column and via a second bi-directional column bus segment 232 to the processing element at the other vertical edge in its column. The column and row edge registers 204, 206 are connected to row and column select lines 214, 216 respectively.

Each processing element is also connected to the row select line 214 and the column select line 216. Activation of a row select line 214 and a column select line 216 connected to the processing element 202a selects the processing element 202a for control (e.g. to receive from or output data to a neighbouring processing element). The data may be output directly from the processing element 202a or may be data that is merely being passed on from one neighbouring processing element to another neighbouring processing element in the same row 210 or column 212 (e.g. from the west neighbouring processing element 202w to the east processing element 202e.

Figure 3:
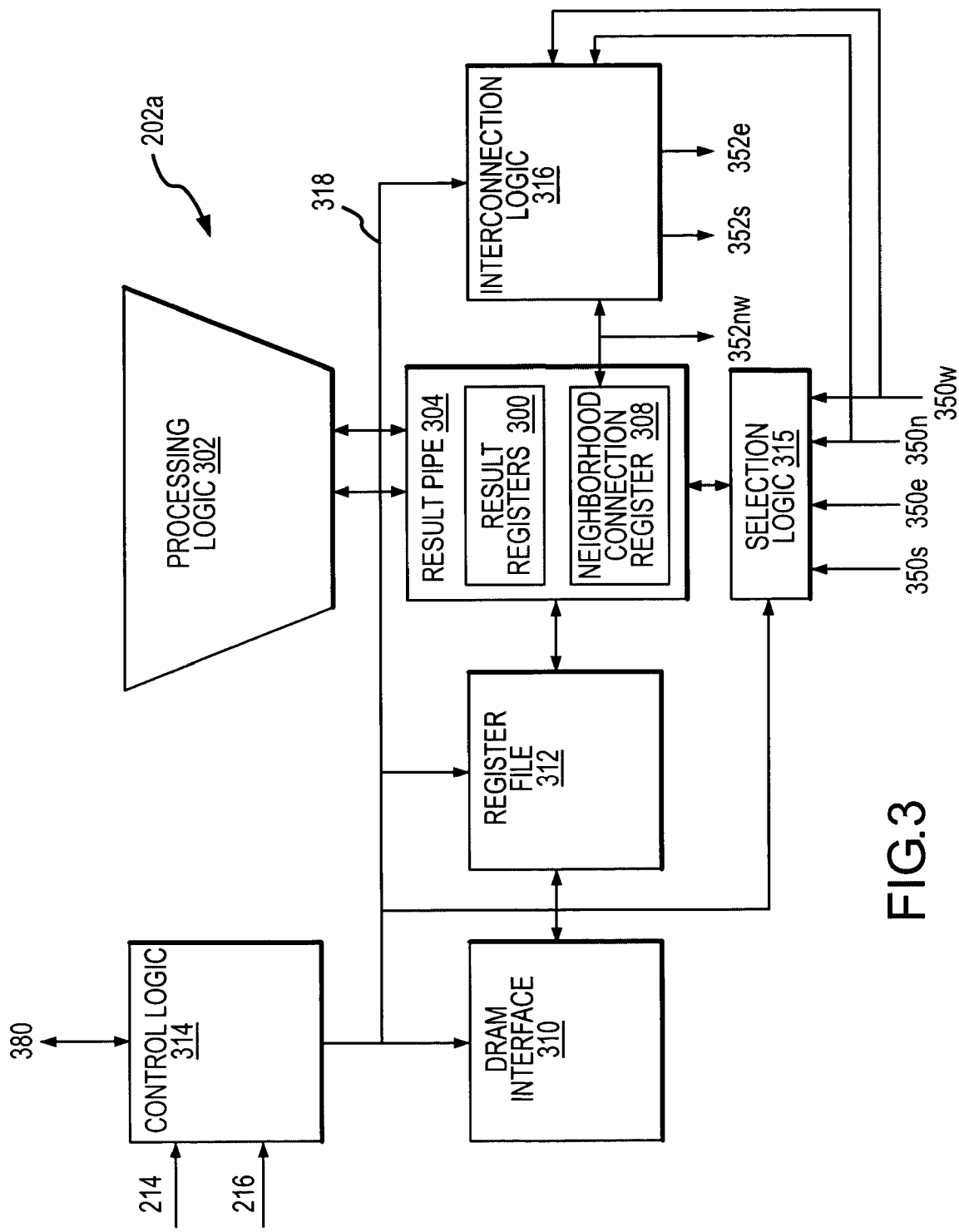
FIG. 3 shows one embodiment of the layout of components in a processing element of the present invention.

Referring to FIG. 3, the components of the processing element 202a are shown. The processing element 202a includes processing logic 302, a result pipe 304 including result registers 306 and a neighbourhood connection register 308. The result pipe 304 is connected to a DRAM interface 310 via a register file 312. Data is passed between the memory 106 and the processing element 202a via the DRAM interface 310 and the register file 312. Data is passed from the result registers 306 to the processing logic 302 to be processed. The processing logic 302 passes results of processing back to the result registers 306. Data from the north, east, south and west neighbouring processing elements 202n, 202e, 202s, 202w is received via selection logic 315 from input respective segments of input row buses 350e, 350w and respective segments of input column buses 350n, 350s into the neighbourhood connection register 308. Data is output to the north neighbouring processing element 202n and the west neighbouring processing element 202w via north/west output bus segment 352nw from the neighbourhood connection register 308.

The north/west output bus segment 352nw is also connected to and inputs data into interconnect logic 316 in the processing element 202a. In addition, the north input row bus segment 350n and west input row bus segment 350w are connected to and input data into the interconnect logic 316. Data is output from the interconnect logic 316 to the south processing element 202s and the east processing element 202e via east output row bus segment 352e and south output column bus segment 352s.

Control logic 314 is connected to the interconnect logic 316, the processing logic 302 and the selection logic 315. The control logic 314 sends signals to the selection logic 315 to select which data should be loaded into neighbourhood connection register 308, i.e. from which of the north, south, east and west neighbouring processing elements 202n, 202s, 202e, 202w data should be loaded.

Interconnect control signals 318 received from the control logic 314 determine the output of the interconnect logic 316.

With one configuration of interconnect control signals 318, data received by the interconnect logic 316 from the neighbourhood connection register 308 is merely output to the east output row bus segment 352e and south output column bus segment 352s. Such a configuration allows data to be shifted from the processing element to the east or south neighbouring processing elements.

With another configuration of interconnect control signals 318, data from the preceding processing element in its row and/or column (i.e. the north and/or west neighbouring processing element 202n, 202w) is merely passed on to the next processing element in series its row and/or column (i.e. the east and/or south neighbouring processing element 202e, 202s). Thus, the north input column bus segment 350n and west input row bus segment 350w are effectively connected to the south output column bus segment 352s and east output row bus segment 352e respectively, thereby acting as a column or a row bus for all of the processing elements in a given row or column. Such a configuration permits data from the row and/or column edge registers to be broadcast to selected processing elements in the array 200.

With yet another configuration of interconnect control signals 318, data received by the interconnect logic 316 from the neighbourhood connection register 308 via the north/west output bus segment 350nw is logically combined with data received via the north input column bus segment 350n and/or west input row bus segment 350w from the north and/or west neighbouring processing element 202n, 202w. The resulting logical combination(s) is/are passed on to the next processing element in series in the row and/or colunm (i.e. the south and/or east processing element 202s, 202e).

Thus, in such a configuration, the east output row bus segment 352e and south output column bus segment 352s simulate row and/or column buses connecting all the processing elements in a row or a column. The row and column buses acts as if driven by open drain drivers (i.e. the value on any bit is the wire-AND of all the processing elements' outputs in a given row or column). In fact, at a given point, data on the south output column bus segment 352s and east output row bus segment 352e between two processing elements will not necessarily be the wire-AND of all the processing elements in their row or column, but the wire-AND from all the preceding processing elements in the row or colunm up to that point. Thus, the east output row bus segment 352e and south output column bus segment 352s do not form "real" buses in the conventional sense, but simulate the effect of a bus to a row or column edge register connected to the last processing element in the colunm or row. This way, logical combinations of data can be selectively loaded ("broadcatch") into the row and column edge registers from one or more processing elements in the array 200.

The interconnect control signals 318 are generated by the control logic 316 from the status of the row and column select lines 214, 216 and array control signals 380, which are sent globally to all of the processing elements in the array 200.

Figure 4:
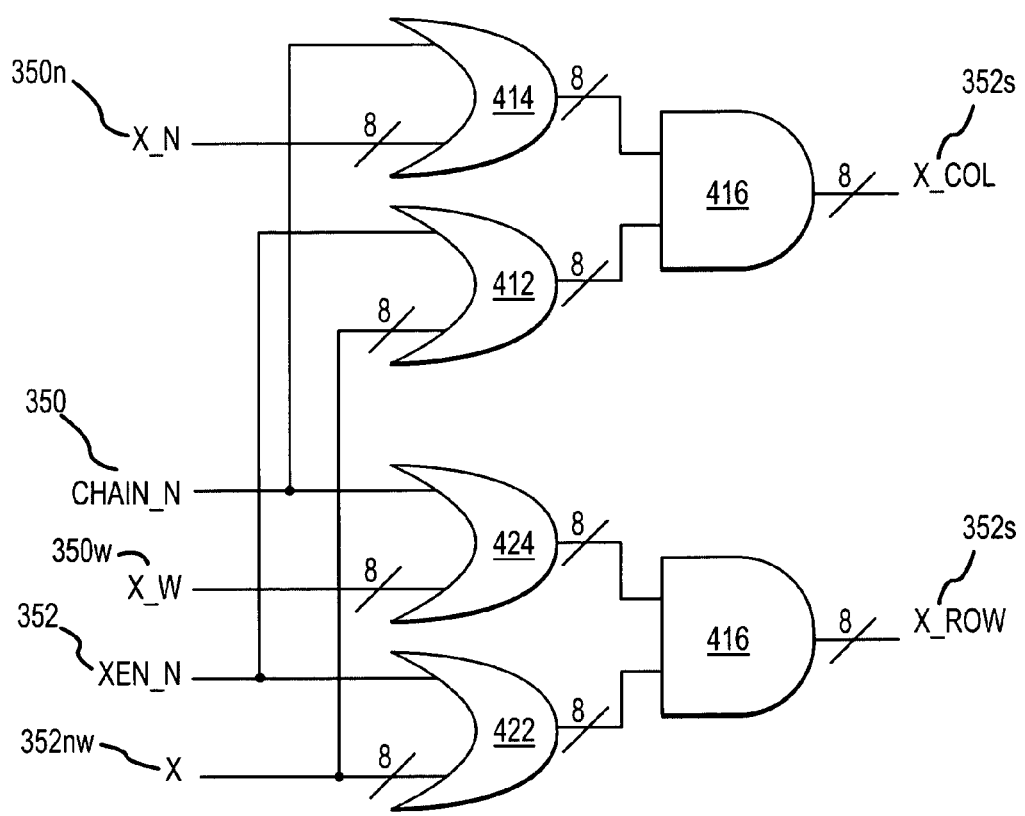
FIG. 4 shows one embodiment of a processing element array interconnect logic in accordance with the invention.

Referring to FIG. 4, one embodiment of the interconnect logic 316 in the processing element 202a is shown. The output, X, of the neighbourhood connection register 308 (i.e. the north/west output interconnect 352nw is connected to a first OR gate 412 and a second OR gate 422. The north input interconnect 350n, with value X_N, is connected to a third OR gate 414 and the west input interconnect 350w, with value X_W, is connected to a fourth OR gate 424. The interconnect control signals 318 from the control logic 314 comprise CHAIN_N 450 and XEN_N 452.

CHAIN_N 450 is input to the third and fourth OR gates 414, 424 and XEN_N 452 is input to the first and second OR gates 412 and 422. A first AND gate 416 generates a logical product of outputs from the first and third OR gates 412, 414 and a second AND gate 426 generates a logical product of outputs from the second and fourth OR gates 422, 424. The east output interconnect 352e receives an output, X_ROW, of the second AND gate 426. The south output interconnect 352s receives an output, X_COL, of the first AND gate 416.

The operation of the interconnect logic 316 in FIG. 4 is given in Table 2 below, where A, B and C represent sample values at inputs to the interconnect logic 316:

with the value from the neighbourhood connection register 308 of the current processing element 202a.

To simply pass a value from the north or west neighbouring processing element 202n, 202s in the row or column of the current processing element 202a on to the south or east neighbouring processing element 202s, 202e, CHAIN_X is set at zero and XEN_N is set with the value 1. Thus, the row and/or column edge registers 204, 206 can broadcast their values to selected processing elements in the array 200.

To pass a value stored in the neighbourhood connection register 308 of the current processing element 202a on to the south or east neighbouring processing element 202s, 202e, CHAIN_X is set with the value 1 and XEN_N is set at zero.

The control circuit 314 generates the interconnect control signals 318, CHAIN_N and XEN_N, from the set of array control signals 380 sent to all of the processing elements in the array 200. In total, there are 67 control signals, which are encoded as a 57 bit processing element instruction sent to all of the processing elements in the array 200. The control logic 3.14 uses 8 of the array control signals 380 shown in Table 2 below to control the transfer of data around the array 200.

TABLE 2

Control signals controlling transfer of data in the array

| ARRAY CONTROL SIGNAL | WIDTH/ bits |
|---|---|
| SEL_X | 2 |
| LX_X | 1 |
| COND_X | 1 |
| SHIFT | 1 |
| SHIFT_LR | 1 |
| SHIFT_UD | 1 |
| BROADCAST | 1 |
| BROADCATCH | 1 |

The array control signal, SEL_X, is generated by the control logic 314 from the value on the row and column select lines 214, 216 (i.e. one of its bits has the value of ROW_SEL and the other has the value of COL_SEL, where ROW_SEL and COL_SEL refer to the binary values on the row and column select lines 214, 216.

The array control signal, LX_X is an unqualified load enable for the neighbourhood connection register 308 in each processing element. LX_X is qualified by SEL_X to enable the neighbourhood connection register 308 to be loaded with one of the values at the north, south, east or west input interconnects 350n, 350s, 350e, 350w.

The array control signal, BROADCAST, signals to the processing elements in the array 200 that the row and column

TABLE 1

| Interconnect circuit operation | | | | | | | |
|---|---|---|---|---|---|---|---|
| X_N 350n | X_W 350s | X 352nw | CHAIN_N 450 | XEN_N 452 | X_ROW 352e | X_COL 352s | Function |
| A | B | C | 0 | 0 | B & C | A & C | Broadcatch |
| A | B | C | 0 | 1 | B | A | Broadcast |
| A | B | C | 1 | 0 | C | C | Shift |

As can be seen from Table 2, with CHAIN_N and XEN_N both being zero, the values output to the east and south output interconnects 352e, 352s are the values from the north and west neighbouring processing elements 202n, 202s ANDed edge registers 204, 206 are broadcasting their values to all of the processing elements in their corresponding row or column. As such, the interconnect logic 316 is set-up such that north and west input interconnects 350n, 350w and south and east output interconnects 352s, 352e become row and column buses 214, 216 (as described above).

The array control signal, BROADCATCH, signals to the processing elements in the array 200 that the row and column edge registers 204, 206 are catching (i.e. being loaded with) a logical combination of the values from selected processing elements in their row or column. As such, the interconnect logic 316 is set-up such that each processing element outputs via east and south output interconnects 352e, 352s to the next processing element in series in its row and/or column a logical combination of the value received from preceding processing elements and the value from the current processing element 202a.

The array control signal, SHIFT, signals to the processing elements that each processing element transfer its value in the neighbourhood connection register 308 along its row or column to the next processing element in series in its row and/or column.

The array control signals, SHIFT_UD and SHIFT_LR, qualify the SHIFT control signal and the direction in which the processing elements should transfer their values to neighbouring processing elements. SHIFT_UD signals that the current processing element 202a should transfer its value to the south neighbouring processing element 202s. SHIFT_LR signals that the current processing element 202a should transfer its value to the east neighbouring processing element 202e. The control logic 314 sends appropriate signals to the selection logic 315 to ensure that values are loaded into the current processing element 202a according to the status of SHIFT_UD and SHIFT_LR. For example, if SHIFT_UD is activated, then the control logic 314 signals to the selection logic 315 that data is to be loaded from the north neighbouring processing element 202n.

The array control signals, CHAIN_N and XEN_N, are generated in the control circuit as follows:

XEN_N=!(SHIFT or (BROADCATCH and ((SHIFT_UD and ROW_SEL) or (SHIFT_LR and COL_SEL)))
CHAIN_N=!(BROADCAST or BROADCATCH)

Referring to FIGS. 5a to 5e, different operations of shifting values between the processing elements in the array 200 are shown (i.e. when the interconnection logic in each processing element is set-up, as described above, to pass a value from one processing element to a neighbouring processing element). Only operations in which values are shifted along rows of the array 200 are shown. However, it will be appreciated by those skilled in the art that values could also be shifted along columns of the processing element array in a similar manner.

Figure 5A:
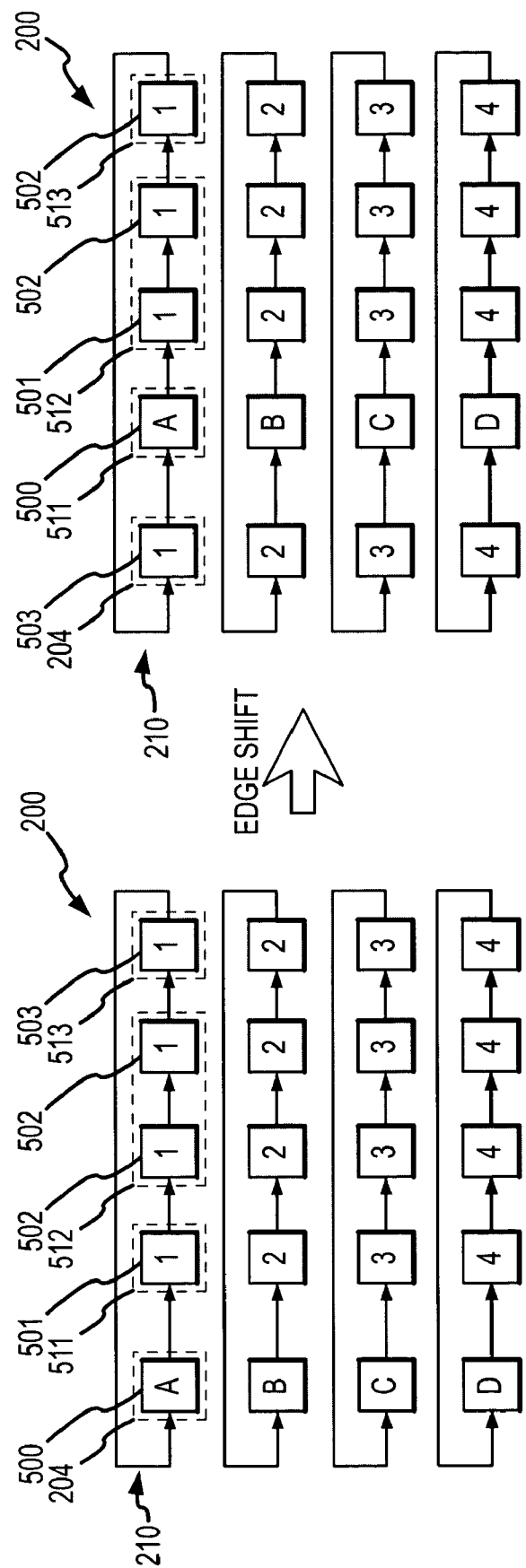
FIGS. 5a to 5d show shift operations which can be carried out in accordance with the present invention.

In FIG. 5a, an edge shift operation is shown for a individual row 210, in which a column edge register value 500 in the column edge register 204 is loaded into a first processing element 511 as values 501, 502 in the first processing element 511 and processing elements 512 are shifted along the row 210 by being selectively loaded into their neighbouring processing elements in series in the row 210. A value 503 in a last processing element 513 at the end of the row is loaded into the column edge register 204. This way, values can be shifted in and out of the column edge registers into and out of the array 200.

Figure 5B:
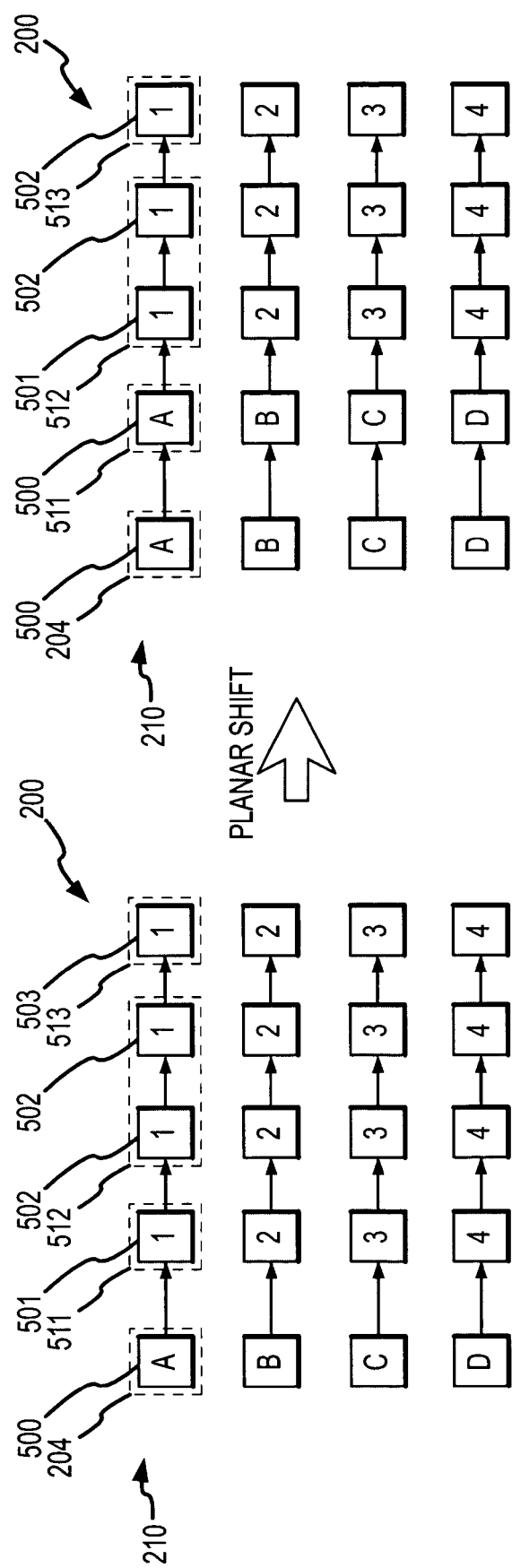

In FIG. 5b, an planar shift operation for an individual row 210 is shown, in which the column edge register value 500 in the column edge register 204 is loaded into the first processing element 511 as values 501, 502 in the first processing element 511 and the processing elements 512 are shifted along the row 210 by being selectively loaded into their neighbouring processing elements in series in the row 210. The value 503 in the last processing element 513 at the end of the row 210 is not loaded into the column edge register 502, instead the value 503 is merely overwritten by a value being loaded into the last processing element 513. The column edge register value 500 is not overwritten and therefore does not change. This way, values can be shifted out of the column edge registers into the array 200 without values in the column edge registers changing.

Figure 5C:
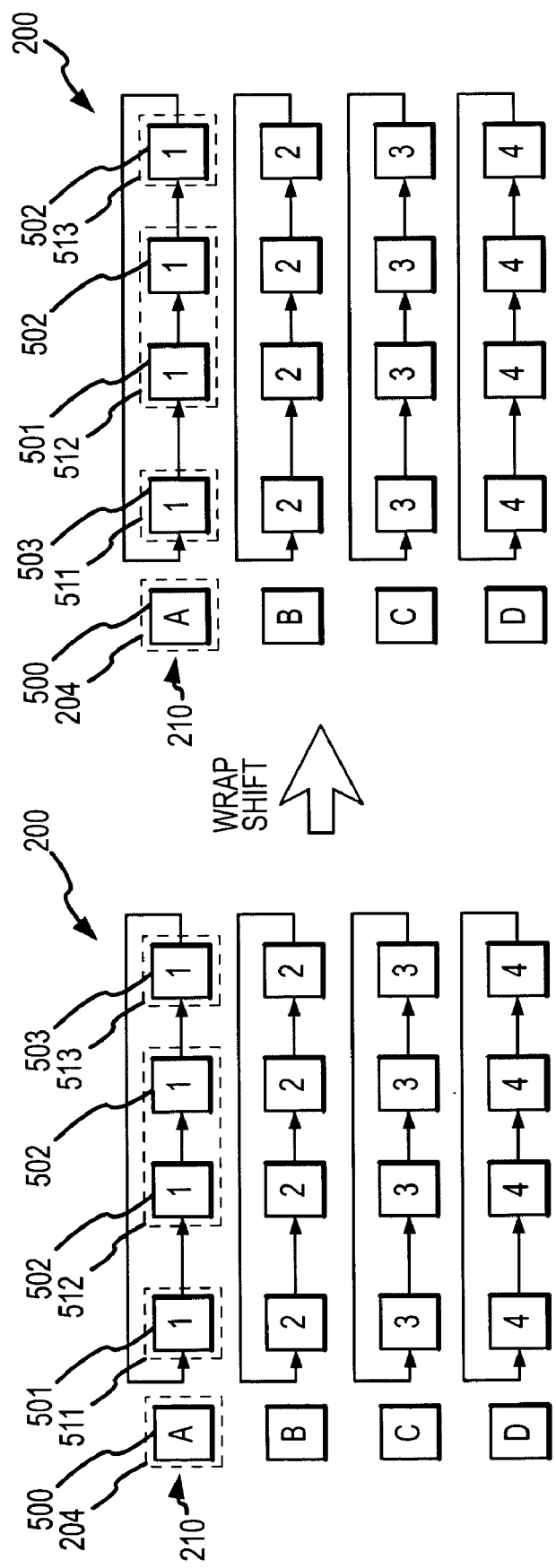

In FIG. 5c, a wrap shift operation for an individual row 210 is shown, in which values 502 in the first processing element 511 and the processing elements 512 are shifted along the row 210 by being loaded into their neighbouring processing elements in series in the row 210. A value 503 in the last processing element 513 is loaded into the first processing element 501. This way, values can be shifted along the rows of the array 200, without affecting the contents of the column edge registers.

Figure 5D:
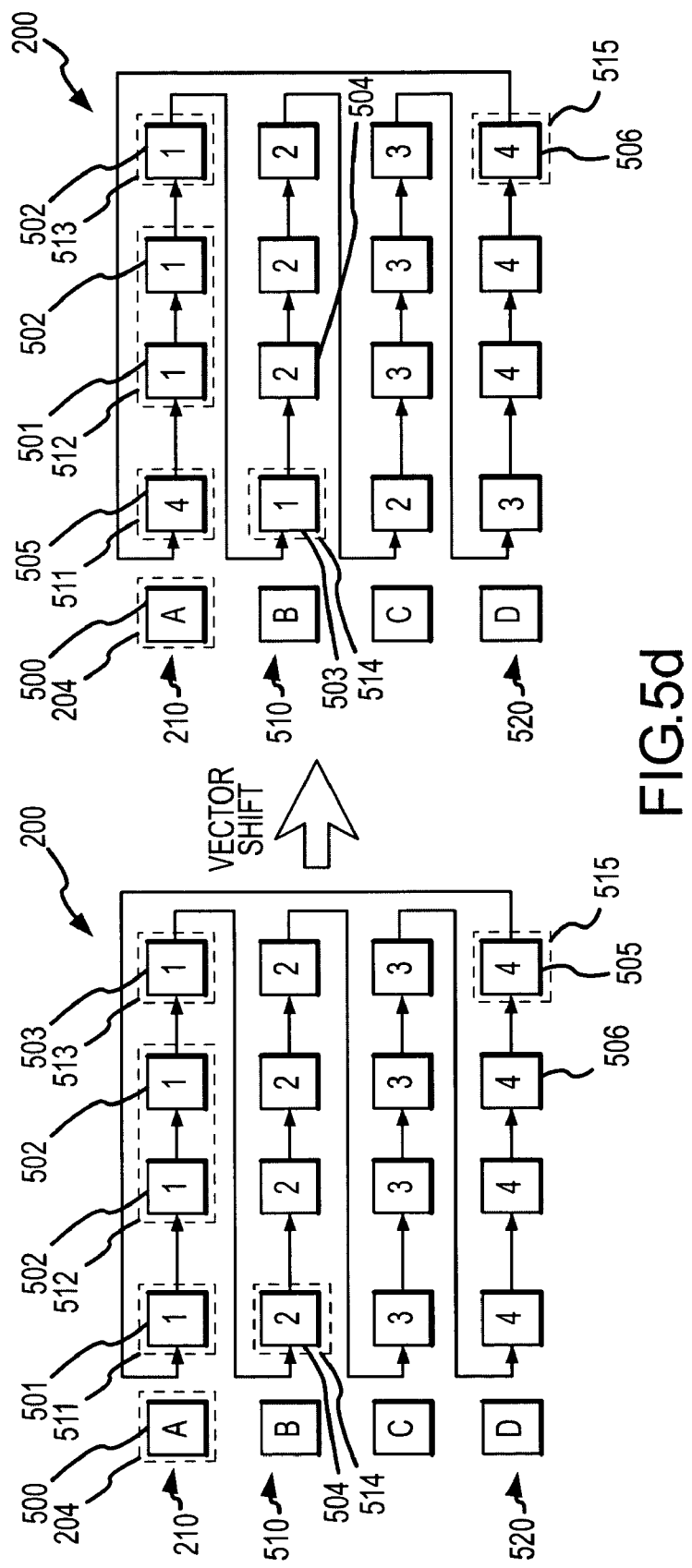

In FIG. 5d, a vector shift operation for an individual row 210 is shown, in which values 501, 502 in the first processing element 511 and processing elements 512 are shifted along the row 210 by being selectively loaded into neighbouring processing elements in series in the row 210. A value 503 in the last processing element 513 at the end of the row 210 is loaded into a further first processing element 514 in a lower row 510. A further value 505 in a further last processing element 515 in a lowest row 520 is loaded into the first processing element 511. This way, values can be shifted around the rows and columns of the array 200, without affecting the contents of the column edge registers. It will be appreciated by those skilled in the art that the shifting of values around the rows and columns of the processing element array, as shown in FIG. 5d, can occur in a direction opposite to that shown, i.e. the value in each processing element is loaded from a east neighbouring processing element and a value in a first processing elements in the row is shifted to the last processing element in a higher row.

The loading of a value into each processing element is selective, in that a processing element is only loaded from a connected processing element or column edge register when selected by its row and column select lines. The loading of values into each processing element only occurs from a neighbouring processing element, column edge register and/or connected processing element from the start or end of a row. Thus, a processing element, which is not selected to be loaded with a value itself, will still load a following processing element in its row and/or column with its value.

Figure 6:
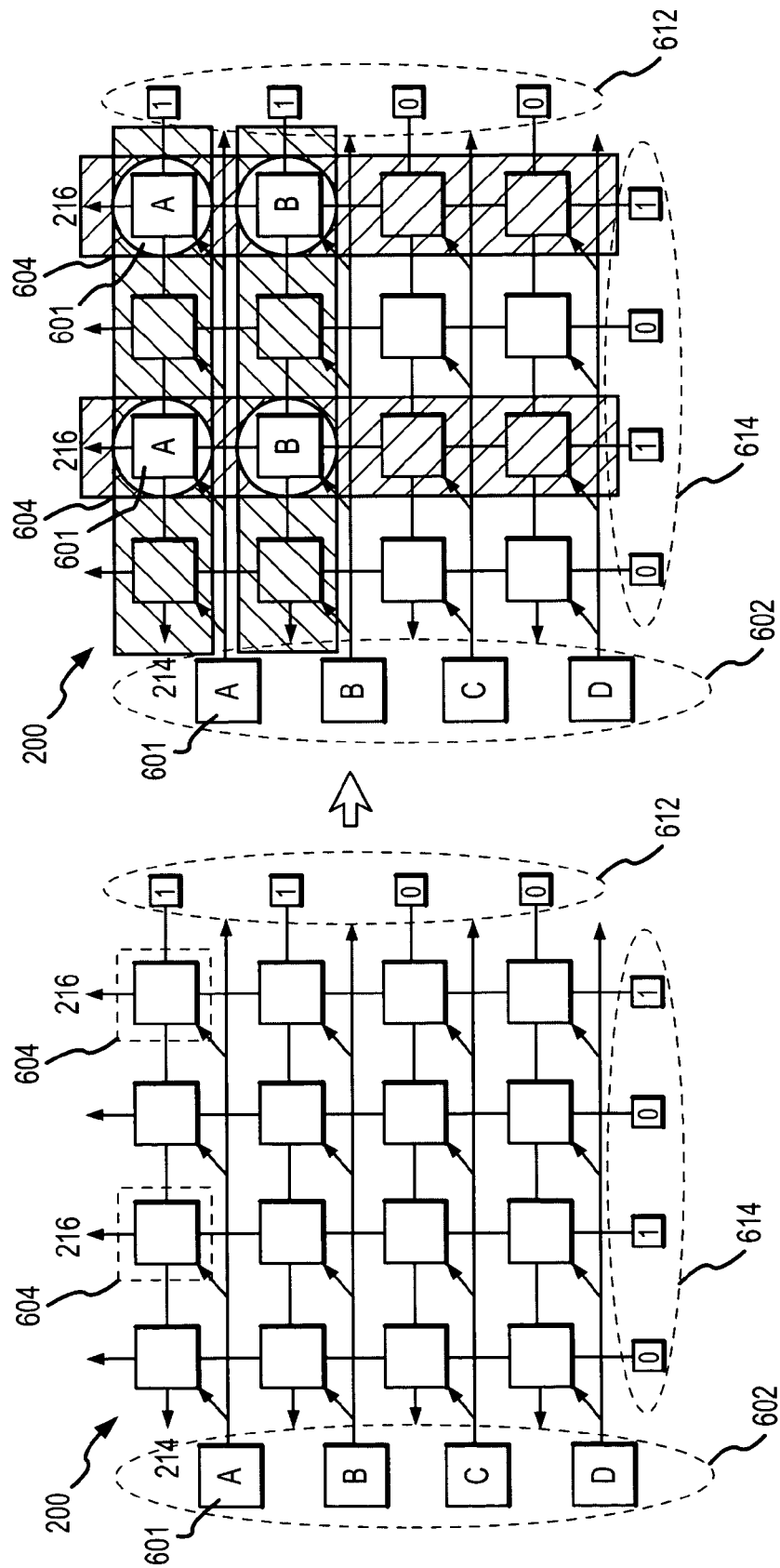
FIG. 6 shows one embodiment of a broadcast operation in accordance with the present invention.

Referring to FIG. 6, an example of how data is broadcast from column edge registers 602 to processing elements in the array 200 is shown. A value 601 stored in one of the column edge registers 602 is output to the row bus 610 and is loaded into selected processing elements 604 which are selected by having both their row and column select lines 214, 216 activated with logical "1" values in row and column select registers 612, 614.

Figure 7:
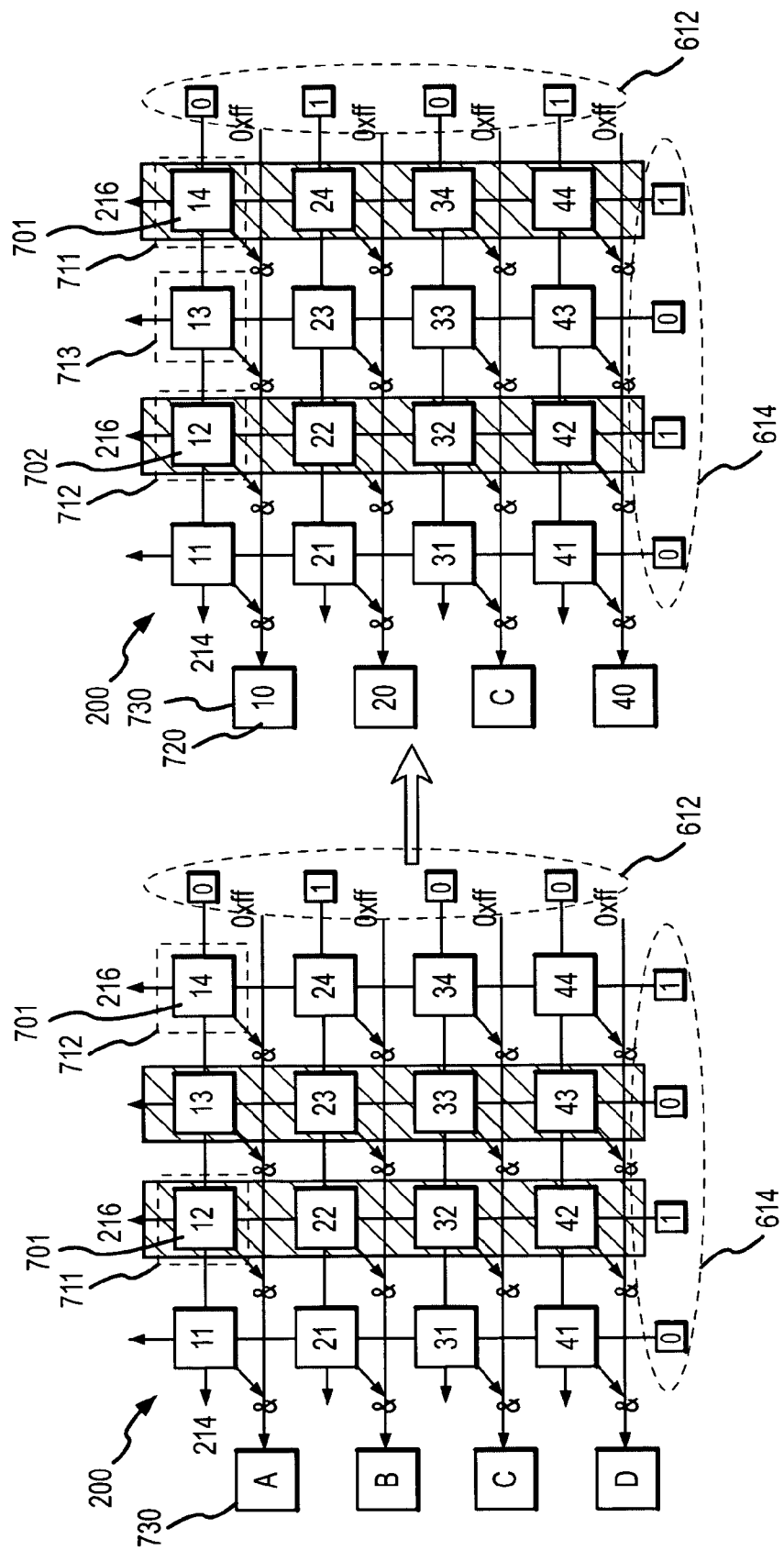
FIG. 7 shows on embodiment of a broadcatch operation in accordance with the present invention.

Referring to FIG. 7, an example of how a logical combination of values stored in selected processing elements 711, 712 is loaded into a column edge register 730 is shown (i.e. a broadcatch operation). When selected by its row and column select lines 214, 216, a first value 701 in a first selected processing element 711 is output to a neighbouring processing element 713 which is not selected and merely passes the first value 701 on to a second selected processing element 712 where it is combined with a second value 702 in a logical product to generate a result value 720. Since no further processing elements are selected in the row, the result value 720 is loaded into the column edge register 730. Such a logical combination is generated in each row and column for all of the processing elements having their row and column select lines 214, 216 activated with logical "1" values in the row and column select registers 612, 614.

Figure 8A:
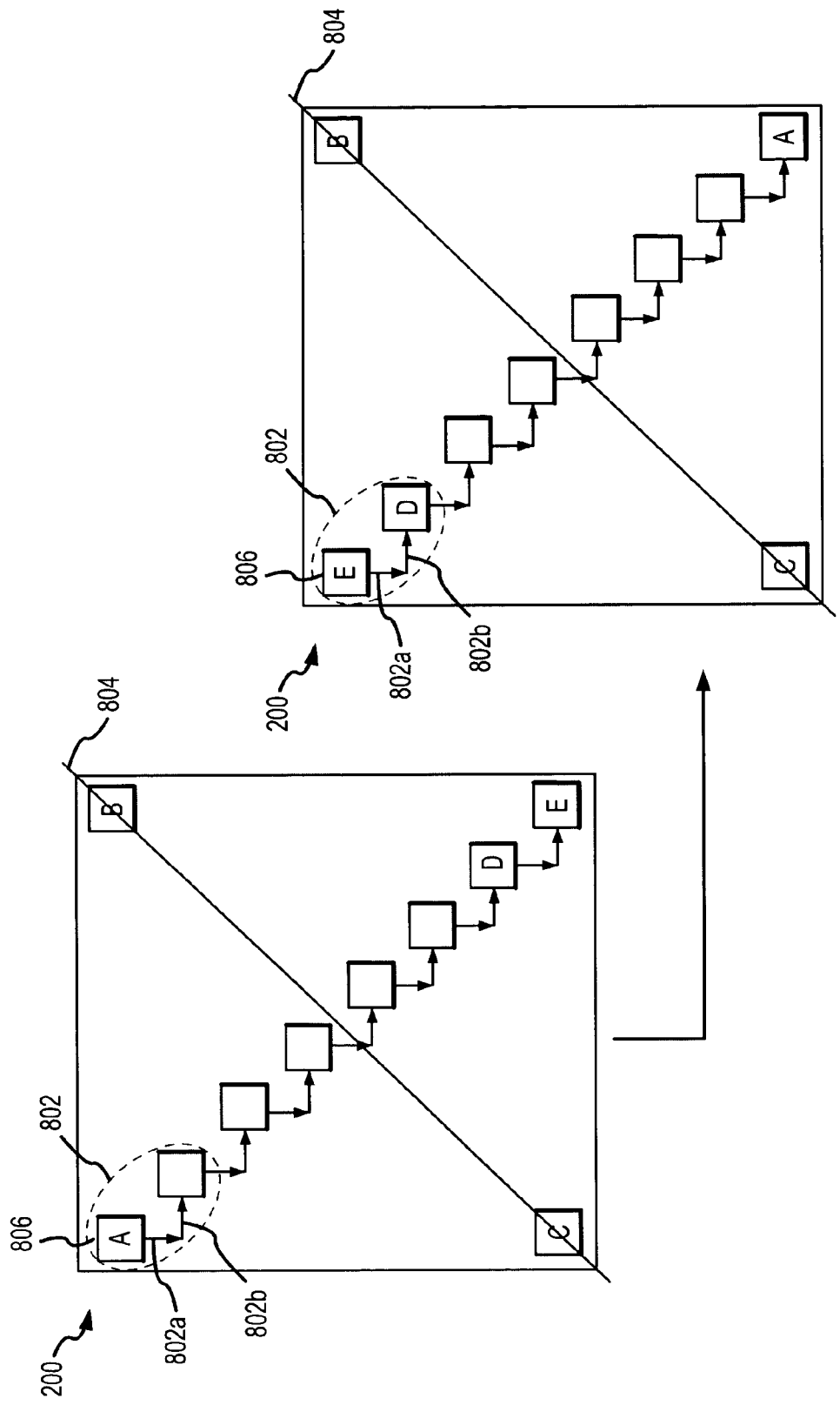
FIGS. 8a and 8b show an example array transformation operation that can be carried out in accordance with the present invention.

Referring to FIG. 8a, an example of an array transformation operation using the shift operations described with reference to FIGS. 5a to 5d above is shown. The transformation operation is a transposition of the data in array 200, for which use of a diagonal shift 802 of data between the processing elements is used.

The diagonal shift 802 is achieved by shifting data with pairs of row and column shift operations 802a, 802b as described above. The number of diagonal shifts, 'N', for each processing element required to achieve a complete transposition of the data in the processing element array 200 depends on the distance of each processing element 806 from a leading diagonal 804.

Figure 8B:
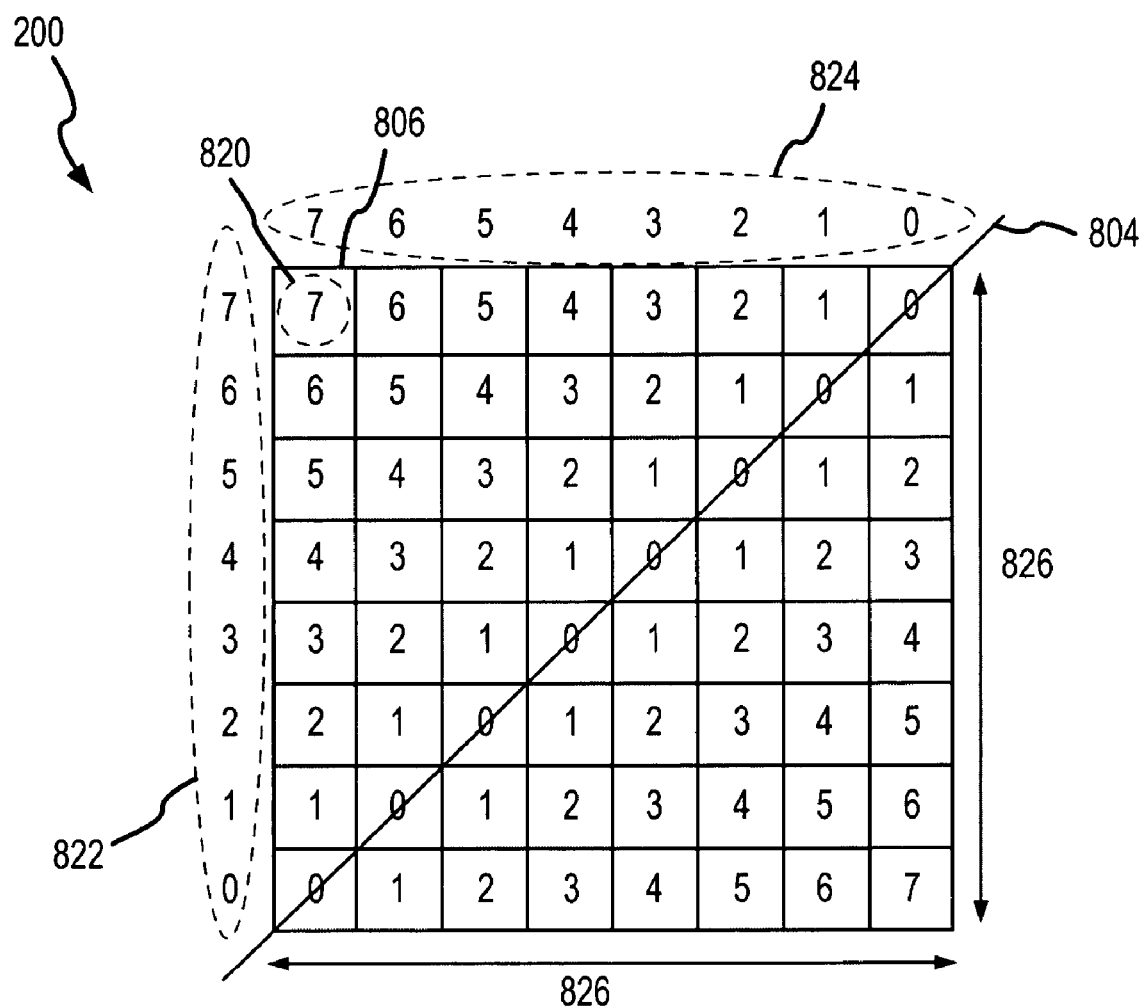

Referring to FIG. 8b, the array 200 is shown with a counter 806 for each processing element 821. A complete transposition operation of the, data stored in the array 200 is performed by decrementing the counter 820 on each diagonal shift 802. When a counter 820 in a given processing element reaches zero, the data in that processing element is not shifted any further and the neighbourhood connection register 308 in that processing element is loaded with its result value from the result register 306.

Each counter 820 starts with the value N, which is obtained for each processing element from the following expression:

(COL_INDEX+ROW_INDEX+1) mod ARRAY_SIZE where COL_INDEX and ROW_INDEX are row and column indexes 822, 824 for a processing element. ARRAY_SIZE is a width/height 826 of the array. N.B. the aforementioned expression gives zero for all the processing elements on the leading diagonal as the values in these processing elements do not have to move.

Of course, the array transformation operation described in FIGS. 8a and 8b above, is merely one example of a number of array transformation operations that can be carried out by application of the shift, broadcatch and broadcast operations described above.

In conclusion, through the introduction and use of the row and column select lines in the manner hereinbefore described, the present invention provides a more efficient and flexible parallel processor in which data is transferred between processing elements in the parallel processor.

It will of course be understood that the present invention has been described above purely by way of example and modifications of detail can be made within the scope of the invention.

The invention claimed is:

1. A parallel processor comprising:
a plurality of row buses divided into a plurality of segments;
an array of processing elements arranged in rows and columns, each of the processing elements including a column enable input and a row enable input, each of the processing elements being enabled responsive to receiving a column activation signal at its column enable input and a row activation signal at its row enable input, each of the processing elements being coupled to each adjacent processing element through a respective segment of a respective one of the row buses and being operable to load the digital signals from the row bus segment to which it is coupled responsive to being enabled by receiving a column activation signal at its column enable input and a row activation signal at its row enable input, each of the processing elements being further operable when the processing element is enabled to couple digital signals to each adjacent processing element through a respective segment of the row bus to which it coupled;
a respective column select line connected to the column enable inputs of the processing elements in each column;
a respective row select line connected to the row enable inputs of the processing elements in each row;
a respective column edge register for each row of processing elements in the array of processing elements, each of the column edge registers being coupled through a respective segment of one of the row buses to the processing element at one end of the respective row and to the processing element at the other end of the respective row, each of the column edge registers being operable to couple digital signals between the processing element at the one end of the respective row through the row bus segment to which it is coupled and the processing element at the other end of the respective row; and
interconnection logic included in each of the processing elements, the interconnection logic being operable when the processing element is enabled to apply to one of the segments of the row bus to which it coupled digital signals corresponding to a value that it is a logical combination of the value corresponding to digital signals applied to another of the segments of the row bus by the column edge register for that row and a value generated by the processing element, and wherein the interconnection logic is operable apply the digital signals corresponding to the logical combination value to the segment of the row bus upon receiving the digital signals coupled to the row bus segment by the column edge register.

2. The parallel processor of claim 1, further comprising:
a row edge register for each column of processing elements in the array of processing elements; and
a plurality of column buses divided into a plurality of segments, each of the segments of the column buses coupling a respective one of the row edge registers to the processing element at one end of the respective column and to the processing element at the other end of the respective column.

3. The parallel processor of claim 2 wherein each of the row edge registers is operable to apply to the segment of the column bus to which it is coupled digital signals corresponding to a value, and wherein each of the processing elements is operable to load the digital signals from the segment of the column bus to which they are coupled responsive to being enabled by receiving a column activation signal at its column enable input and a row activation signal at its row enable input.

4. The parallel processor of claim 1 wherein the logical combination is a logical product.

5. The parallel processor of claim 1, wherein each processing element further comprises a control circuit operable to receive and decode control signals.

6. The parallel processor of claim 1 wherein each of the processing elements comprises:
a selection circuit having a plurality of inputs and a selection circuit output, the selection circuit being operable to couple one of the inputs; and
a connection register having an input coupled to the selection circuit output.

7. The parallel processor of claim 6 wherein, for each of the processing elements, a first input of the selection circuit is coupled to a first adjacent processing element in the same row as the processing element, a second input of the selection circuit is coupled to a second adjacent processing element in the same row as the processing element, a third input of the selection circuit is coupled to a processing element in a first adjacent row, and a fourth input of the selection circuit is coupled to a processing element in a second adjacent row.

8. An active memory array of rows and columns, comprising:
a respective row edge register for each column of the array;
a respective column select line for each column of the array;
a respective column bus for each column of the array, each of the column buses being divided into a plurality of segments, one of the segments of each of the column buses being coupled to a respective one of the row edge registers;
a respective column edge register for each row of the array;
a respective row select line for each row of the array;
a respective row bus for each row of the array, each of the row buses being divided into a plurality of segments; and
a plurality of processing elements arranged in the rows and columns of the array, each of processing elements being coupled to each adjacent processing element by a respective segment of a row bus and a respective segment of a column bus, the processing elements at opposite ends of each column being coupled to a respective one of the row edge registers so that the row edge register can couple digital signals between the processing element at one end of the respective column and the processing element at the other end of the respective column, each of the processing elements having a column select input coupled to the column select line for the respective column and a row select input coupled to the row select line for the respective row, each of the processing elements being enabled by column and row activation signals coupled to the column select input and the row select input, respectively, each of the processing elements, when enabled, being operable to couple digital signals to each segment of the row bus to which it is connected, each of the processing elements, when enabled, further being operable to couple digital signals to each segment of the column bus to which it is connected, each of the processing elements further an interconnection logic operable to apply to one of the bus segments to which it coupled digital signals corresponding to a value that it is a logical combination of the value corresponding to digital signals received from another of the bus segments to which it is coupled and a value generated by the processing element, the processing element being operable apply the digital signals corresponding to the logical combination value to the bus segment upon receiving the digital signals from the row bus segment.

9. A parallel processor comprising:
a plurality of row buses divided into a plurality of segments;
a plurality of column buses divided into a plurality of segments;
an array of processing elements arranged in rows and columns, each of the processing elements including a column enable input and a row enable input, each of the processing elements being enabled responsive to receiving a column activation signal at its column enable input and a row activation signal at its row enable input, each of the processing elements being coupled to each adjacent processing element in the same row and column through interconnection logic that is connected to respective segments of a respective one of the row buses and to respective segments of a respective one of the column buses, the processing element being operable to load a first set of digital signals from either one of the row bus segments or either one of the column bus segments to which it is coupled responsive to being enabled by receiving a column activation signal at its column enable input and a row activation signal at its row enable input, the interconnection logic being configured in at least one operating mode to generate digital output signals corresponding to a logical combination of the first set of digital signals and a second set of digital signals generated by the processing element when the processing element is enabled, the digital output signals being applied to at least one of the adjacent processing elements through a respective segment of either the row bus or the column bus to which it coupled upon receiving the first set of digital signals;
a respective column select line connected to the column enable inputs of the processing elements in each column;
a respective row select line connected to the row enable inputs of the processing elements in each row; and
a respective column edge register for each row of processing elements in the array of processing elements, each of the column edge registers being coupled through a respective segment of one of the row buses to the processing element at one end of the respective row and to the processing element at the other end of the respective row, each of the column edge registers being operable to couple digital signals between the processing element at the one end of the respective row through the row bus segment to which it is coupled and the processing element at the other end of the respective row.

10. The parallel processor of claim 9, further comprising a row edge register for each column of processing elements in the array of processing elements.

11. The parallel processor of claim 10 wherein each of the row edge registers is operable to apply to the segment of the column bus to which it is coupled digital signals corresponding to a value, and wherein each of the processing elements is operable to load the digital signals from the segment of the column bus to which they are coupled responsive to being enabled by receiving a column activation signal at its column enable input and a row activation signal at its row enable input.

12. The parallel processor of claim 9 wherein the logical combination is a logical product.

13. The parallel processor of claim 9 wherein each processing element further comprises a control circuit operable to receive and decode control signals.

14. The parallel processor of claim 9 wherein each of the processing elements comprises:
a selection circuit having a plurality of inputs and a selection circuit output, the selection circuit being operable to couple one of the inputs; and
a connection register having an input coupled to the selection circuit output.

15. The parallel processor of claim 14 wherein, for each of the processing elements, a first input of the selection circuit is coupled to a first adjacent processing element in the same row as the processing element, a second input of the selection circuit is coupled to a second adjacent processing element in the same row as the processing element, a third input of the selection circuit is coupled to a processing element in a first adjacent row, and a fourth input of the selection circuit is coupled to a processing element in a second adjacent row.

* * * * *